US011475552B2

(12) United States Patent
Ambrose et al.

(10) Patent No.: US 11,475,552 B2
(45) Date of Patent: Oct. 18, 2022

(54) METHOD AND APPARATUS FOR SENSING SUSPENDED DUST CONCENTRATION

(71) Applicant: Purdue Research Foundation, West Lafayette, IN (US)

(72) Inventors: Rose Prabin Kingsly Ambrose, West Lafayette, IN (US); Yumeng Zhao, West Lafayette, IN (US); Zhongzhong Niu, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/107,999

(22) Filed: Dec. 1, 2020

(65) Prior Publication Data

US 2021/0166373 A1 Jun. 3, 2021

Related U.S. Application Data

(60) Provisional application No. 62/983,962, filed on Mar. 2, 2020, provisional application No. 62/942,773, filed on Dec. 3, 2019.

(51) Int. Cl.
*G06T 7/00* (2017.01)
*H04N 7/18* (2006.01)
*G01N 21/90* (2006.01)

(52) U.S. Cl.
CPC .......... *G06T 7/0004* (2013.01); *G01N 21/90* (2013.01); *H04N 7/18* (2013.01); *G06T 2207/10016* (2013.01); *G06T 2207/30108* (2013.01)

(58) Field of Classification Search
None
See application file for complete search history.

(56) References Cited

U.S. PATENT DOCUMENTS

| 1,937,721 A | 12/1933 | Simon |
| 3,672,781 A * | 6/1972 | Rosenblum .......... G01N 21/538 356/438 |

(Continued)

FOREIGN PATENT DOCUMENTS

| CN | 106370571 | * 2/2017 |
| CN | 108956400 A | * 12/2018 |

(Continued)

OTHER PUBLICATIONS

Budde et al. Retrofitting smartphones to be used as particulate matter dosimeters. In Proceedings of the 2013 International Symposium on Wearable Computers (ISWC '13). Association for Computing Machinery, New York, NY, USA, 139-14 (Year: 2013).*

(Continued)

*Primary Examiner* — Stefan Gadomski
(74) *Attorney, Agent, or Firm* — Purdue Research Foundation

(57) ABSTRACT

The present disclosure provides to a novel two-target method for measuring the concentration of dust clouds, and an apparatus system that uses the novel two-target method. Cornstarch, corn dust, and saw dust are tested with the apparatus system with the method. This method used the light extinction coefficient of a dust cloud between two targets using a digital camera. This extinction coefficient is linearly related to the concentration of the dust, and the mass extinction coefficient is the key value for this measurement method. The mass extinction efficiency (K) depend greatly on the physical and chemical properties of the dust particles.

11 Claims, 5 Drawing Sheets

(56) References Cited

U.S. PATENT DOCUMENTS

| | | | | |
|---|---|---|---|---|
| 3,756,720 | A * | 9/1973 | Skala | G01N 15/065 356/37 |
| 4,492,472 | A * | 1/1985 | Asano | G01B 11/24 250/559.23 |
| 4,793,710 | A * | 12/1988 | Sapko | G01N 21/4738 356/448 |
| 2007/0064980 | A1* | 3/2007 | Knox | G08B 17/125 382/128 |
| 2007/0160402 | A1 | 7/2007 | Ryan, Jr. | |
| 2013/0116935 | A1* | 5/2013 | Roding | G01N 15/1463 702/29 |
| 2013/0336526 | A1* | 12/2013 | Cetin | G06K 9/00147 382/103 |
| 2017/0284934 | A1* | 10/2017 | Wang | G08B 29/185 |
| 2019/0154560 | A1* | 5/2019 | Matayoshi | G06T 7/0002 |

FOREIGN PATENT DOCUMENTS

| | | | |
|---|---|---|---|
| KR | 10-1892999 B1 | * | 10/2018 |
| KR | 2019-0020403 A | * | 3/2019 |
| WO | WO 2011/002272 | * | 1/2011 |

OTHER PUBLICATIONS

Budde, M.; Leiner, S.; Köpke, M.; Riesterer, J.; Riedel, T.; Beigl, M. FeinPhone: Low-cost Smartphone Camera-based 2D Particulate Matter Sensor. Sensors 2019, 19, 749. https://doi.org/10.3390/s19030749 (Year: 2019).*

Budde, Matthias, Marcel Köpke, and Michael Beigl. "Design of a light-scattering particle sensor for citizen science air quality monitoring with smartphones: Tradeoffs and experiences." ProScience 3 13-20. (Year: 2016).*

Yu et al. "Dust-concentration measurement based on Mie scattering of a laser beam" (2017) PloS one, vol. 12 (8): p. 20181575-e0181575.

Zhao et al. "Modeling dust dispersion and suspension pattern under turbulence" (2019) Journal of Loss Prevention in the Process Industries, vol. 62: p. 103934.

Zhao et al. "A real-time method for sensing suspended dust concentration from the light exticntion coefficient" (2020) Journal of Loss Prevention in the Process Industries, vol. 67: p. 104242.

Fu et al. "Evaluating the effects of aluminum dust concentration on explosions in a 20L spherical vessel using ultrasonic sensors" (2020) Powder Technology, vol. 367 p. 809-819.

Yang et al. "Real-time monitoring of toxic components from fine dust air pollutant samples by utilizing spark-induced plasma spectroscopy" (2020) Chemosphere, vol. 257: p. 127237.

Parracino et al. "Experimental Real-Time Tracking and Numerical Simulation of Hazardous Dust Dispersion in the Atmosphere" (2018) Enhancing CBRNE Safety & Security: Proceedings of the SICC 2017 Conference, p. 41-48.

Benton-Vitz "Evaluation of the pDR-1200 Real-Time Aerosol Monitor" (2008) Journal of Occupational and Environmental Hygiene, vol. 5 (6): p. 353-359.

Adachi et al. "Electrostatic dispersion of aerosol particles carrying unipolar charge" (1985) Journal of chemical engineering of Japan, vol. 18 (6): p. 502-509.

Baddock et al. "A visibility and total suspended dust relationship" (1994) Atmospheric environment, vol. 89: p. 329-336.

Camino et al. "An empirical equation to estimate mineral dust concentrations from visibility observations in Northern Africa" (2015) Aeolian research, vol. 16: p. 55-68.

Chepil et al. "Sedimentary characteristics of dust storms; Part II, Visibility and dust concentration" (1957) American Journal of Science, vol. 255: p. 104-114.

Chung et al. "Atmospheric Loadings, Concentrations and Visibility Associated with Sandstorms: Satellite and Meteorological Analysis" (2002) Water, air & soil pollution: Focus, vol. 3 (2): p. 21-40.

Dacunto et al. "Determining PM2.5 calibration curves for a low-cost particle monitor: common indoor residential aerosols" (2015) Environmental Science: Processes & Impacts, vol. 17 (11), p. 1959-1966.

Graves et al. "Using visibility cameras to estimate atmospheric light extinction" (2011) 2011 IEEE Workshop on Applications of Computer Vision (WACV), p. 577-584.

Hauert et al. "Dust cloud characterization and its influence on the pressure-time-history in silos" (1996) Process Safety Progress, vol. 15(3), p. 178-184.

Healey et al. "Radiometric CCD camera calibration and noise estimation" (1994) IEEE Transactions on Pattern Analysis and Machine Intelligence, vol. 16(3), p. 267-276.

Hinds Aerosol technology: properties, behavior, and measurement of airborne particles: (2012) John Wiley & Sons, Chap. 17, p. 379-385.

Klippel et al. "Dust concentration measurements during filling of a silo and CFD modeling of filling processes regarding exceeding the lower explosion limit" (2014) Journal of Loss Prevention in the Process Industries, vol. 29, p. 122-137.

Ogle, "Dust explosion dynamics" (2016) Butterworth-Heinemann.

Patterson et al. "Measurements of visibility vs mass-concentration for airborne soil particles" (1976) Atmospheric Environment, vol. 11 (2), p. 193-196.

Rusu-Zagar et al. Air Pollution Particles PM10, PM2, 5 and the Tropospheric Ozone Effects on Human Health. (2013) Procedia-Social and Behavioral Sciences, vol. 92, p. 826-831.

Tasić et al. "Comparative assessment of a real-time particle monitor against the reference gravimetric method for PM10 and PM2. 5 in indoor air" (2012) Atmospheric environment, vol. 54, p. 358-364.

Wang et al. "Surface observation of sand and dust storm in East Asia and its application in CUACE/Dust" (2008) Atmospheric Chemistry and Physics, vol. 8 (3), p. 545-553.

Sun et al. "Investigation of measurements of polarized properties of atmospheric scattering radiation" (2005) Chinese journal of quantum electronics.

He et al. "Single Image Haze Removal Using Dark Channel Prior" (2011) IEEE transactions on pattern analysis and machine intelligence, vol. 33 (12), p. 2341-2353.

Zhong et al. "Optical Fiber Sensor For Dust Concentration Measurement" (1988) Fiber Optic and Laser Sensors vol. 0838, p. 285-287.

Burke et al. "Precision Determination of Atmospheric Extinction at Optical and Near-infrared Wavelengths" (2010) The Astrophysical journal, vol. 720 (1), p. 811-823.

Lane et al. "Optical Extinction Measurements of Dust Density in the GMRO Regolith Test Bin" (2016) NASA Center tor AeroSpace Information (CASI) Conference Proceedings.

International Search Report and Written Opinion issued by ISA/US, Commissioner for Patents, dated Mar. 26, 2021, for International Patent Application PCT/US2020/062631; 7 pgs.

* cited by examiner $$\varepsilon = \frac{\ln\left(\frac{G_{0r1} - G_{gr1}}{G_{0r2} - G_{gr2}}\right)}{R}$$

FIG. 8

METHOD AND APPARATUS FOR SENSING SUSPENDED DUST CONCENTRATION

CROSS-REFERENCE TO RELATED APPLICATION

This application claims the priority benefit of U.S. Provisional Patent application No. 62/983,962, filed Mar. 2, 2020, which in turn claims the benefit of U.S. Provisional Application No. 62/942,773, filed on Dec. 3, 2019. The entire disclosures of the above applications are incorporated by reference.

TECHNICAL FIELD

The present disclosure generally relates to a novel two-target method for measuring the concentration of dust clouds, and an apparatus system that uses the novel two-target method.

BACKGROUND

This section introduces aspects that may help facilitate a better understanding of the disclosure. Accordingly, these statements are to be read in this light and are not to be understood as admissions about what is or is not prior art.

Increasing production demands have exacerbated the health and safety risks to workers in particulate material processing and handling facilities. Respirable aerosols like PM2.5 and PM10 cause lung disease when workers are overexposed, and dust in industrial environments can be highly explosive. The concentration of aerosolized dust is the most important indicator when monitoring industrial environments for breathability and explosion risk.

Well-developed gravimetric and light scattering methods are widely used for measuring airborne dust concentrations. Gravimetric methods form the basis of European and US standard methods for monitoring outdoor concentration of PM10 and PM2.5. In these methods, aerosol particles are collected in separators, and the filtered particles are then weighed using a scale. To accomplish this, the filter must be weighed before and after filtration, which is time-consuming and makes the method unsuitable for real-time monitoring applications A more-direct method uses the Lambert-Beer law to measure airborne dust concentrations in silos. This probe includes a laser and a photodiode, which must be calibrated before use. Light scattering is also exploited by the portable dust track aerosol monitor and optical fiber method. Other techniques use electrostatic interactions, including scanning mobility particle sizers like the differential mobility analyzer. Even though electrostatic equipment can measure the number of aerosol particles per unit volume, these devices are generally very costly and are mostly used for testing particle-size distribution.

Nearly all methods for measuring dust concentration on the market today require the purchase and installation of new equipment in an industrial facility. However, aerosolized dust clouds are dynamic and move with air currents in the facility, and dust can be emitted from a variety of locations in a processing facility. So, there is a need for a portable and inexpensive dust-concentration measurement method/probe.

SUMMARY

In one embodiment, the present disclosure provides a method of measuring dust concentration in an environment containing dusts, wherein the method comprises:

providing an image and/or video capturing device;

providing a first target, wherein the first target has a surface comprising one or more darker sections and one or more lighter sections, wherein said one or more darker sections and one or more lighter sections can provide sufficient contrast, and said one or more lighter sections are configured to provide reference background;

providing a second target, wherein the second target has a surface comprising one or more darker sections and one or more lighter sections, wherein said one or more darker sections and one or more lighter sections can provide sufficient contrast, and said one or more lighter sections are configured to provide reference background;

positioning said image and/or video capturing device and said first target and said second target to ensure that said image and/or video capturing device can take image and/or video of the two targets;

taking one or more image and/or video of said first target and said second target; and analyzing captured one or more image and/or video with one or more algorithm to provide dust concentration in the environment containing dusts.

In one embodiment, the present disclosure provides an apparatus system for measuring dust concentration in an environment containing dusts, wherein the system comprises:

an image and/or video capturing device;

a first target, wherein the first target has a surface comprising one or more darker sections and one or more lighter sections, wherein said one or more darker sections and one or more lighter sections can provide sufficient contrast, and said one or more lighter sections are configured to provide reference background; and a second target, wherein the second target has a surface comprising one or more darker sections and one or more lighter sections, wherein said one or more darker sections and one or more lighter sections can provide sufficient contrast, and said one or more lighter sections are configured to provide reference background;

wherein said image and/or video capturing device and said first target and said second target are positioned in such a way that said image and/or video capturing device can take image and/or video of the two targets.

DETAILED DESCRIPTION

Figure 1:
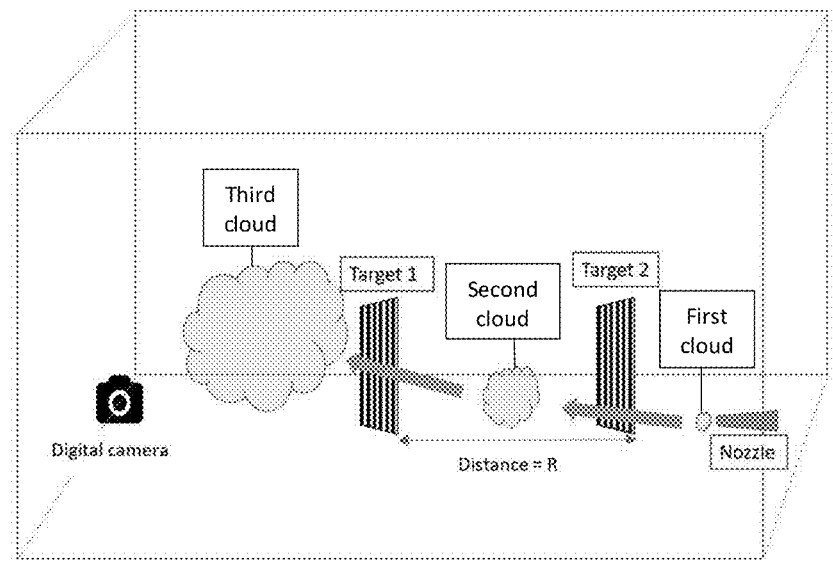
FIG. 1 illustrates schematic representation of image sensing procedures.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

The present application generally relates to a novel two-target method for measuring the concentration of dust clouds, and an apparatus system that uses the novel two-target method.

Smoke and suspended dust particles can reduce visibility as the particles scatter and absorb light. The reduction in intensity of light passing through a dust cloud is referred to as extinction. The effects of dust concentration on visibility through the atmosphere have been studied widely. Several empirical relationships between dust concentration and visibility have been proposed. These relationships are used widely in environmental science but have not been studied for use in industrial environments. Each empirical relationship between visibility and dust concentration was developed for a different specific environment and type of dust. Therefore, to estimate the dust concentration from visibility in an indoor environment, new empirical relationships will need to be developed. Atmospheric science generally classifies dust clouds by their cause, like dust storms or fuel burning, so the materials making up the dust varies and are usually underspecified. However, industrial dust emissions are primarily from known products, so the components and size of dust will be consistent and known. Light will be affected predictably by such clouds of dust, which will make empirical relationships between dust concentration and light extinction relatively easy to establish.

The development and widespread acceptance of smartphones means that many people have ready access to digital cameras. Changes in light intensity can be detected using these cameras' CCD/CMOS sensors to infer dust concentrations. This disclosure presents a novel method for measuring dust concentrations using smart-phone cameras. Relationship between dust concentration and extinction coefficients were studied to develop empirical linear regression model for several types of aerosolized material.

Theoretical Background

Extinction coefficient represents the rate of diminution of transmitted light via scattering and absorption for a medium. The particle concentration affects the extinction coefficient (ε) of the atmosphere (See Ogle, R. A., et al. Dust explosion dynamics, Chapter 4. Radiative Properties of Dust Clouds. Butterworth-Heinemann. 169-173, 2016):

$$\varepsilon = \frac{\pi d_p^2 N q}{4} \quad (1)$$

where $d_p$ is the particle diameter, N is the number of particles per unit volume and q is the dimensionless extinction efficiency of a single particle. For the same dust sample, the aerosol particle-size distribution and q are considered constant at all mass concentrations.

Thus, the mass concentration C can be calculated as follows:

$$C = \frac{2 d_p \rho}{3 q} \cdot \varepsilon \quad (2)$$

where ρ is the particle density. In order to obtain the dust concentration, extinction coefficient ε value is needed, and to calculate this value a dimensionless mass extinction efficiency K (m$^2$/g) is introduced, where $$\frac{1}{K} = \frac{2 d_p \rho}{3 q} \quad (3)$$

As the particle diameter and chemical composition are constant for the same material in a dust cloud, so the dimensionless extinction efficiency, density are also considered as constant. The mass extinction efficiency is obtained through experiments as described in section 2.2 that represent particle properties.

The extinction coefficient can be calculated based on atmospheric light scattering models. The atmospheric light scattering model describes the observed light intensity of a target and a background, as that intensity is affected by the extinction coefficient at distance R (See Graves and Newsam, Using visibility cameras to estimate atmospheric light extinction. IEEE Workshop on Applications of Computer Vision (WACV), pp. 577-584, 2011):

$$J_{0r} = J_0 e^{-\varepsilon R} + J_A(1 - e^{-\varepsilon R}) \quad (4)$$

$$J_{gr} = g e^{-\varepsilon R} + J_A(1 - e^{-\varepsilon R}) \quad (5)$$

where, $J_{0r}$ is the observed target light intensity, $J_0$ is the real target light intensity, $J_{gr}$ is the observed background light intensity, g is the real background light intensity, $J_A$ is the ambient light intensity, and R is the distance from the observation location to the target.

By solving equations 4 and 5, the extinction coefficient can be calculated as:

$$\varepsilon = \frac{\ln\left(\frac{J_{0r} - J_{gr}}{J_0 - J_g}\right)}{R} \quad (6)$$

The light intensity (J) can be obtained through a camera. Most cameras use charge coupled device (CCD) sensor, and it will bring in the noise to the tested light intensity. J is linearly related with the intensity value obtained from a CCD sensor (G) (See Healey, G. E., et al., Radiometric CCD camera calibration and noise estimation. IEEE Transactions on Pattern Analysis and Machine Intelligence, 16(3), 267-276. 1994):

$$G = A(J + N_{DC} + N_S + N_R) \quad (7)$$

where A is the parameter to amplify the magnitude of the powder of signal from the CCD sensor, $N_{DC}$ is the dark current noise, $N_S$ is the zero mean Poisson shot noise, and $N_R$ is the readout noise. Noise is unstable in most cases and makes the result inconsistent. On the other hand, when a response intensity is lesser than the noise, then the intensity will not be accurate or even undetectable.

To overcome the noise effect, a two-target method can be used. The extinction coefficient calculated using the intensity value measured from two targets can be used to eliminate the effects of noise:

$$\varepsilon = \frac{\ln\left(\frac{G_{0r1} - G_{gr1}}{G_{0r2} - G_{gr2}}\right)}{R} \quad (8)$$

where $G_{0r1}$ and $G_{gr1}$ are the first target and its background intensity value calculated from the image by averaging the grey value of all pixels, respectively, and $G_{0r2}$ and $G_{gr2}$ are the second target and its background intensity value calculated from the image, respectively. R is the distance between the two targets. In this study, a photo of two targets with black and white stripes is analyzed to determine the concentration of dust in a chamber (FIG. 1).

Materials and Methods

Experimental Dust Dispersion

A transparent 0.3×0.3×0.45 m³ chamber, with two targets placed inside, was used for dust cloud concentration measurement tests. Cornstarch (Clabber Girl Corporation, IN, USA), sawdust (System Three Resins, Inc, WA, USA) and corn dust obtained from a local grain elevator were used in the all our experimental measurements. Dust samples of 0.5 g, 1.0 g, 1.5 g, 2.0 g, or 2.5 g were placed inside the chamber, where the theoretical concentration corresponds to 17.5, 25, 42.5, 50, 67.5 g/m³ respectively, and then dispersed using 100 kPa compressed air. To test the limits of our measurements, cornstarch dust tests were conducted using up to 4 g of powder.

Real Concentration During Dispersion

Figure 2:
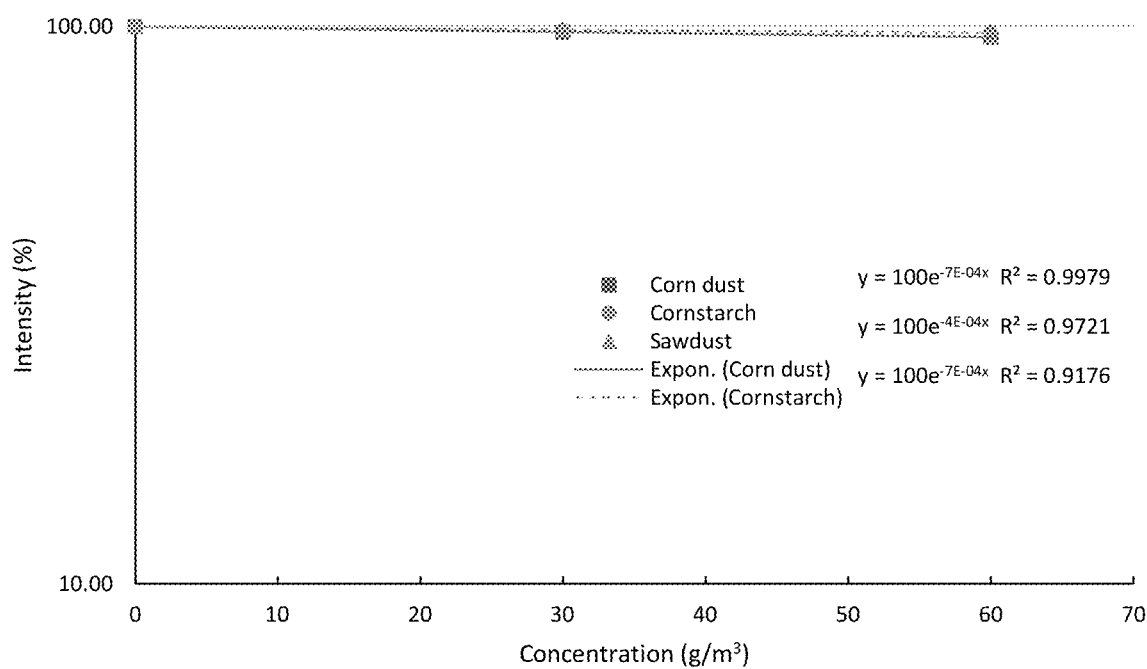
FIG. 2 illustrates calibration curve for measuring dust concentration using laser. (▲ and dotted line represents sawdust, ● and dashed line represents cornstarch, and ■ and solid line represents corn dust).

The real concentration during dispersion was measured using a 532-nm laser instrument (Besram Technology Inc, Wuhan, China). For these tests, the laser beam was placed in the center of chamber and a photodiode was placed at the chamber wall, 0.225 m apart. During dust dispersion, the photodiode voltage was measured with a DM2 Compact Digital Multimeter (Wavetek, California, USA), and readings were recorded every 0.5 s. The change in laser intensity is exponentially related to the dispersed dust concentration. Before using this method of measurement, the laser system was calibrated by dispersing a known dust concentration in alcohol. The change in intensity is recorded using the laser through a 30 and 60 g/m³ dust-alcohol suspension, and the exponential fit for the concentration and the change in intensity was obtained (FIG. 2). Then, the dust cloud concentration in the chamber was calculated using this calibrated curve, which is considered as the real dust concentration. The calibration measurements were conducted in triplicates for each type of dust.

Two-Target Method Experimental Measurement of Dust Concentration

The iPhone 7 (Apple Inc., USA) was used as camera and was placed inside the chamber to take a video of two targets during dust dispersion, with 1080p resolution at 60 fps. The distances between the lens and Target 1 and between Target 1 and Target 2 were both 0.22 m, respectively, as shown in FIG. 1. Still images were then extracted from the video, at every 0.1 s, using FFmpeg, an open video processing software. Custom-written scripts in Matlab 2015a (MathWorks, Inc., USA) were then used for image analysis. Each trial was repeated three times.

The targets in the experiment were paper printed with black and white strips, where the black strips are considered as target and the white strips were treated as the reference background. During image analysis, the two printed targets were cropped from each image, and then the black and white strips from each target were separated using Otsu's method as implemented in Matlab. The separated black and white strips were then converted from RGB into HSV format using a built-in tool in Matlab, and the average intensity values of the black strips (B) and white background (G) were obtained. Finally, the dust's extinction coefficient was calculated using Eq. 8.

The extinction coefficient value was calculated for all the frames extracted from the video, at intervals of 0.1 s. The dispersed dust concentration changes during dispersion. The peak extinction coefficients of 0.5 s interval was averaged and considered as extinction coefficient, ε. The peak concentration measured using laser were considered as concentration (C) for calculation purposes. Using linear relationship between ε and C, the mass extinction coefficient K, was calculated as given in equation 2.

Dust Particle Properties

The size and shape of the dust particles were measured using the Morphologi G3-ID instrument (Malvern Instruments, Malvern, UK) using bottom light approach. The bottom light intensity was set at 80. This analysis returns the circularity equivalent diameter (CE-diameter), and intensity values. The intensity value is the average greyscale of particle images, ranging from 0 (black) to 255 (white). The Morphologi G3-ID uses a bottom-lit microscope, so the particle intensities are affected by light scattering and absorption, giving a qualitative indicator of the particles' extinction efficiency. Particle density was tested using the AccuPyc II 1340 Pycnometer (Micromeritics Instrument Corp., GA, USA).

Statistical Analysis

Regression analysis on extinction coefficient values from each trial was conducted using PROC REG function in the SAS software (SAS Inc., NC, USA). The atmospheric air extinction coefficient is negligible at the short distance of 0.025 m with no suspended particulate matter, so the interception was set to 0 in this regression analysis.

Results and Discussion

Dust Concentration and Extinction Coefficient During Dispersion

Dust was dispersed fully within 3 s of introducing the compressed air from a nozzle. The dust concentrations as measured using the laser and the extinction coefficient values are plotted in FIG. 3-5, for 2 g dust dispersion. The peak concentration of suspended dust was observed around 0.5 to 1.5 s, and then decreased as the particles settled. As shown in FIG. 1, during the dust dispersion process, the particles, represented by a first cloud, are dispersed via the compressed air from the nozzle. The particles are dispersed between Target 1 and Target 2, represented by a second cloud. The particles are then further dispersed between Target 1 and the Digital camera, represented by a third cloud. Afterwards, the particles are suspended due to the air movement and the particles then settle once they hit the chamber wall. Almost all suspended dust had settled after about 4 s, regardless of the amount of dust dispersed in air.

Figure 3:
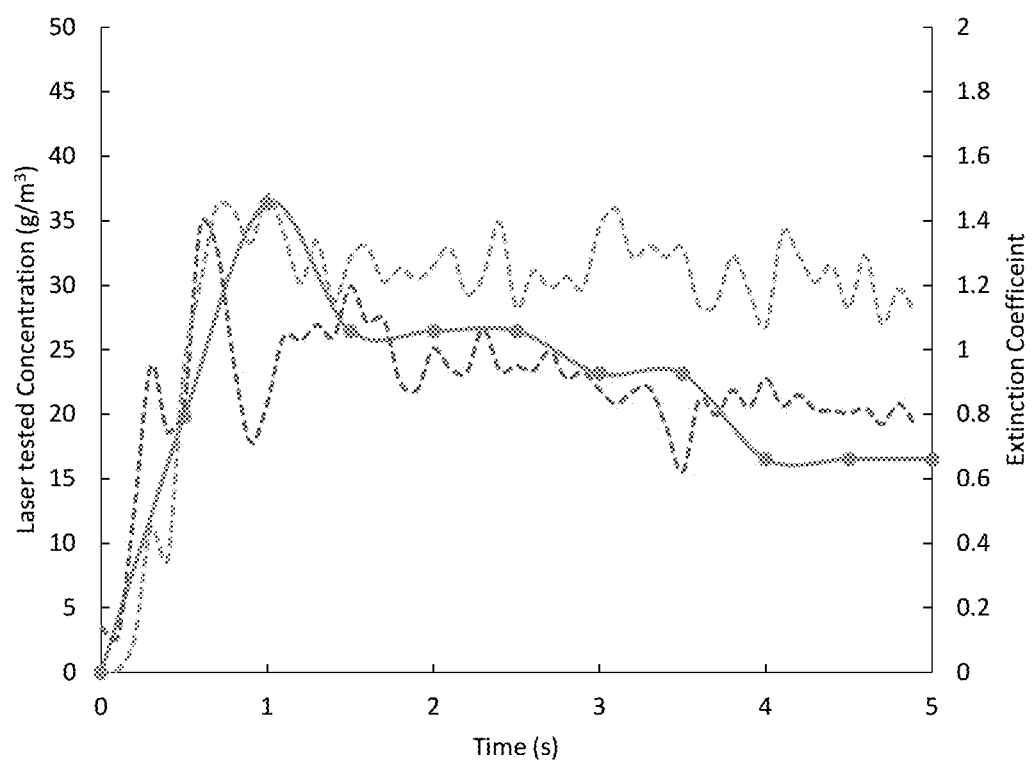
FIG. 3 illustrates cornstarch extinction coefficient during dispersion. (Solid line is the laser measured concentration, and dashed line is the extinction coefficient of two replicate dispersion experiments).
Figure 4:
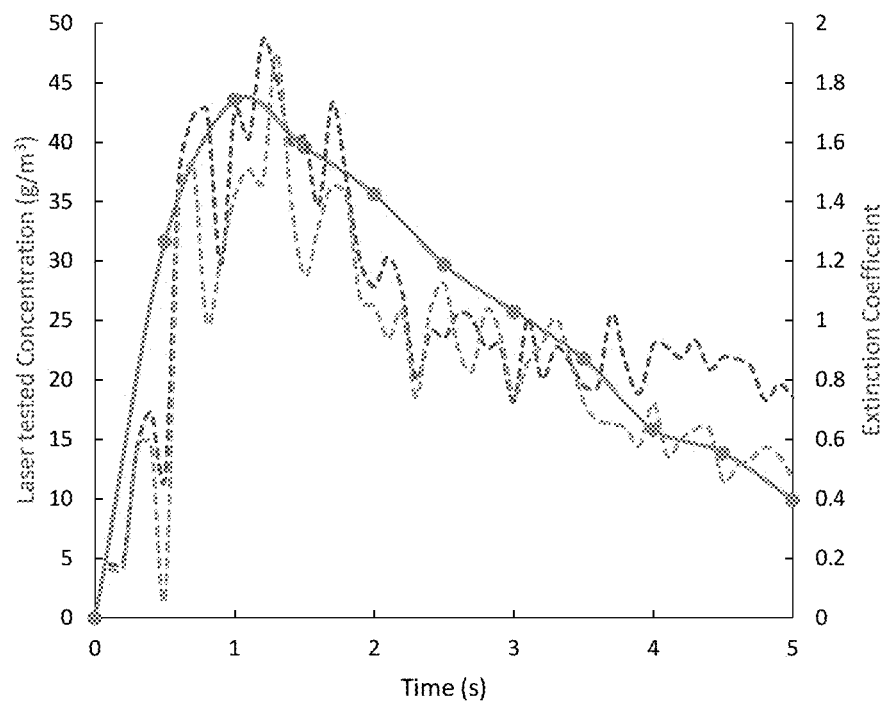
FIG. 4 illustrates sawdust extinction coefficient during dispersion. (Solid line is the laser measured concentration, and dashed line is the extinction coefficient of two replicate dispersion experiments).
Figure 5:
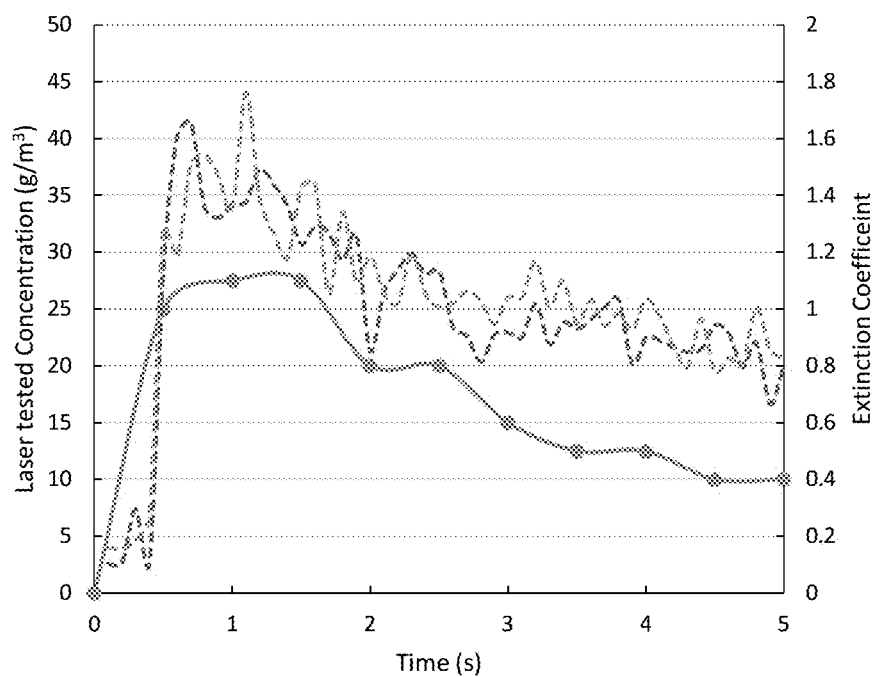
FIG. 5 illustrates corn dust extinction coefficient during dispersion. (Solid line is the laser measured concentration, and dashed line is the extinction coefficient of two replicate dispersion experiments).

FIG. 3-FIG. 5 allow the comparison of extinction coefficient values from the two-target method with the real concentration values as measured with a laser. The extinction coefficient values follow a similar trend as the dust concentration during dispersion. The peak concentration was reached around 0.5-1.5 s in both cases, and then decreased. This result suggests that the changing suspended dust concentration affects the extinction coefficient value. A small valley, before the peak value, appears in all extinction coefficient measurements. This valley is explained by the heterogeneity of the dust cloud distribution at the beginning of dispersion. The pressurized airflow dispersed the dust from a single point near the nozzle, so most of the dust moves away from target 1 towards the camera at the beginning of the dispersion process. With the movement of the dust cloud, there was a moment, represented by the third cloud, that dust was concentrated between target 1 and the digital camera, while the concentration between the two targets is low. This is the moment where the valley is observed. The peak concentration in suspended dust occurs once the dust is uniformly spread throughout the chamber.

The laser measurements were recorded at intervals of 0.5 s, and this low resolution meant that the laser measurements cannot show valley before the peak concentration. Furthermore, laser measurements only record information from the area that the laser beam passes through, so the sampling size is small, and these measurements were highly dependent on location. The extinction coefficient shows fluctuation, might because of the movement of dust particle. The saw dust and corn dust extinction coefficients are reproducible. However, cornstarch suspension pattern was different after the peak suspended concentration, which is also due to unstable and ununiform dispersion of cornstarch agglomerates.

Mass Extinction Efficiency

Figure 6:
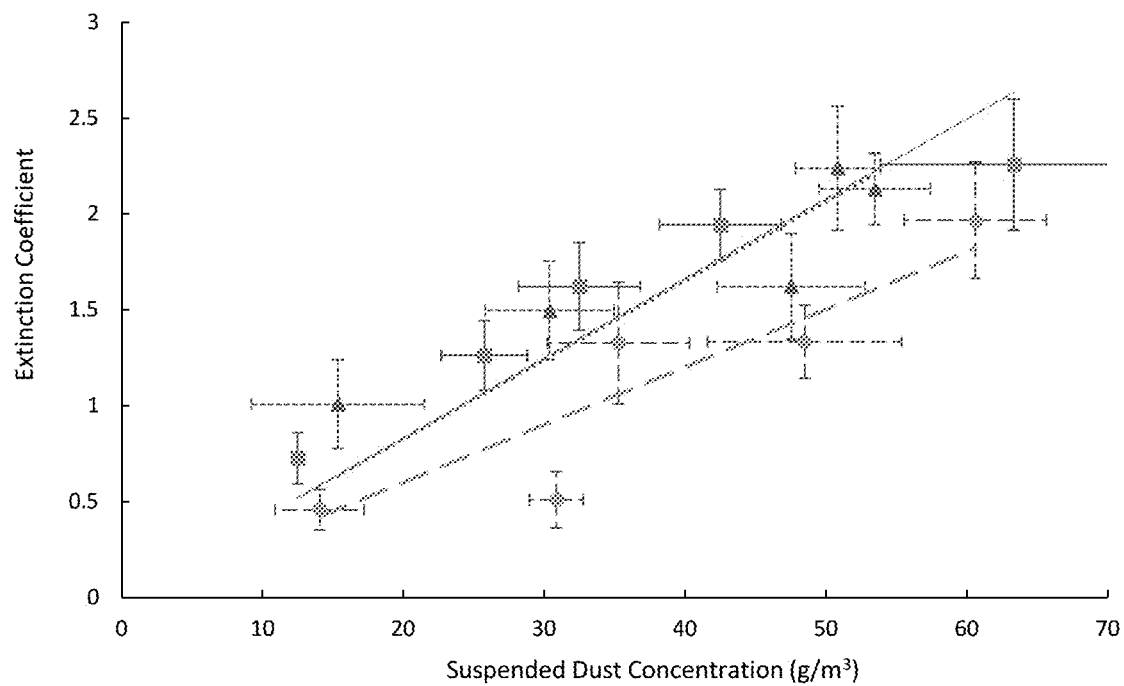
FIG. 6 illustrates extinction coefficient at different dust concentrations (▲ and dotted line represents sawdust, ● and dashed line represents cornstarch, and ■ and solid line represents corn dust).

The mass extinction efficiency (K) clearly follows a linear relationship with dust concentration, as shown in FIG. 6. K value was obtained from the linear regressions model between extinction coefficient and concentration. The calculated K values for cornstarch, corn dust and sawdust were 0.03042, 0.04158, and 0.04128 $m^2/g$, respectively. The $R^2$ value for saw dust and corn dust regression equations were within 95% limit, and the $R^2$ value for cornstarch regression equation was 93%.

The published mass extinction efficiency values of submicron urban/rural aerosol particles ranged from 1.1 up to 9 $m^2/g$. The sandy soil particle with size of 9.5 μm have K value of 0.11 $m^2/g$ under infrared light. The K values decrease with the increasing of the particle size, and the light wavelength have less effect on the K value of larger particles. Due to particle size and particle property differences, the values reported in this study are much smaller than the published value for PM 2.5 and PM 10 particles.

Figure 7:
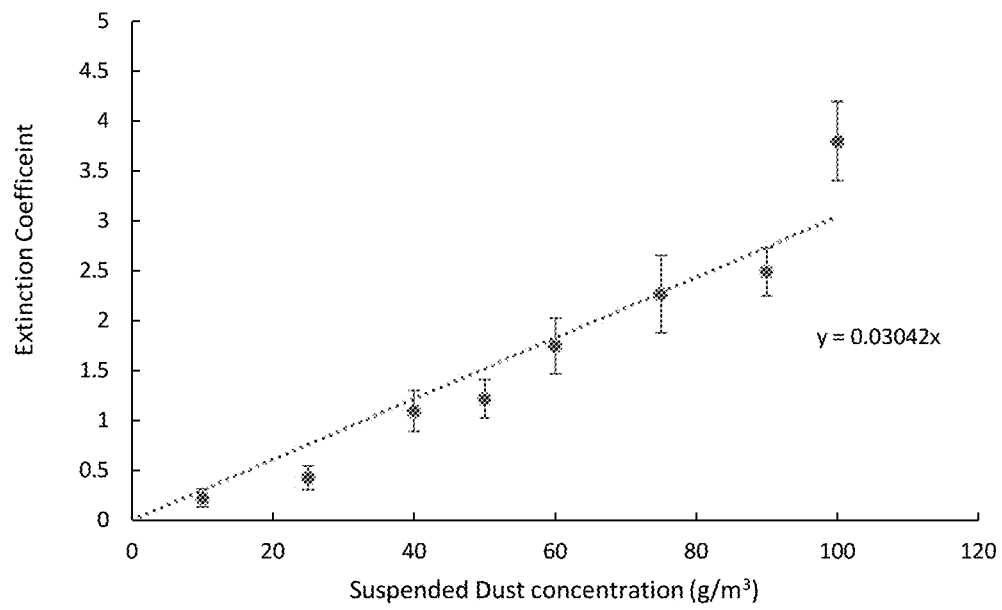
FIG. 7 illustrates extinction coefficient for corn starch up to 100 g/m$^3$.

To check the limit of the measurements, additional trial was conducted with cornstarch particles up to 100 $g/m^3$ suspended dust concentration (FIG. 7). The measured extinction coefficient value was higher than the expected value at 100 $g/m^3$ concentration. This could also be due to the sensitivity limitations of the CCD/CMOS sensors in the imaging device. At a very low light intensity level, the CCD sensor noise is independent of the signal. As a consequence, when detecting the light intensity at 100 $g/m^3$ for cornstarch, the photocurrents signal could be weaker than the CCD sensor noise which lead to this unexpected observed result. However, for safety reasons, when the dust cloud is this thick it can be seen plainly by the human eye, so the sensor does not need to be sensitive to high suspended dust concentrations.

Dust Particle Properties

The particle size, shape, and light intensity values are shown in Table 1. CE-diameter and intensity values are different among three samples. Sawdust particles are smaller and more intense than corn dust and cornstarch.

TABLE 1

Dust particle properties

|  | CE Diameter (μm) | Intensity Mean | Density (kg/$m^3$) | K value ($m^2/g$) |
| --- | --- | --- | --- | --- |
| Cornstarch | 11.49 (13.07) | 72.34 (37.24) | 1491.8 | 0.03042 |
| Sawdust | 7.68 (6.24) | 112.90 (17.77) | 1491.9 | 0.04128 |
| Corn dust | 25.37 (23.02) | 67.94 (10.96) | 1484.8 | 0.04158 |

Note:
(Values in parentheses are standard deviations.)

According to Equation 3, the particle size, density, and extinction efficiency affect the mass extinction efficiency. The dimensionless particles' extinction efficiency is related to both light absorption efficiency and scattering efficiency. Particles' light absorption mainly depends on their chemical composition, and the particles' scattering properties are related to particle size and shape.

The intensity value of sawdust particles is 112.90, which is almost double of corn dust, when measured in bottom light microscope. The intensity values indicate that the sawdust particle is brighter in color than corn dust and cornstarch powder, perhaps because the sawdust particle is smaller in size and scatters light more efficiently and absorb less light than the other two materials. Thus, sawdust may have the lowest dimensionless extinction efficiency than the other two samples. However, the sawdust also has smallest particle size, which has negative correlation with K (equation 3). Under the combined effects of the small particle size and low dimensionless extinction efficiency, the sawdust's K is similar to that of corn dust.

On the other hand, when comparing cornstarch with corn dust, the differences in K value between these two powders could due to the size and density differences. Although cornstarch has similar intensity value as corn dust, but the particle size is smaller, and the density is larger than corn dust.

For the dust materials we tested, the K value is affected by the particle size and the dimensionless extinction efficiency of the particles and particle density. Thus, for a material with consistent size, shape, and chemical components, the K value can be measured experimentally that can be used to back calculate the concentration by two-target sensing method. To establish a K library for different dust materials is essential to apply this method. This sensing method can measure suspended dust concentration estimation real-time.

Conclusion

A two-target method for measuring the concentration of dust clouds was developed and tested with cornstarch, corn dust, and saw dust. This method used the light extinction coefficient of a dust cloud between two targets using a digital camera. This extinction coefficient is linearly related to the concentration of the dust, and the mass extinction coefficient is the key value for this measurement method. The mass extinction efficiency (K) depend greatly on the physical and chemical properties of the dust particles. Accurate measurements will therefore require a library of mass extinction efficiency values that cover a wide range of dust materials. The experiments discussed above returned $R^2$ values greater than 0.9, showing that the method is well-suited for further development.

The two-target method can be used using any imaging system thereby presenting as a low-cost and in-situ suspended dust concentration measurement process with a quick response time. It is also highly portable and can cover a larger measurement area than a laser-based equipment. For practical applications of this method, the camera can be pointed at two printed targets to test the dust concentration in any environment with sufficient visible lighting.

In one embodiment, the present disclosure provides a method of measuring dust concentration in an environment containing dusts, wherein the method comprises:

providing an image and/or video capturing device;

providing a first target, wherein the first target has a surface comprising one or more darker sections and one or more lighter sections, wherein said one or more darker sections and one or more lighter sections can provide sufficient contrast, and said one or more lighter sections are configured to provide reference background;

providing a second target, wherein the second target has a surface comprising one or more darker sections and one or more lighter sections, wherein said one or more darker sections and one or more lighter sections can provide sufficient contrast, and said one or more lighter sections are configured to provide reference background;

positioning said image and/or video capturing device and said first target and said second target to ensure that said image and/or video capturing device can take image and/or video of the two targets;

taking one or more image and/or video of said first target and said second target; and analyzing captured one or more image and/or video with one or more algorithm to provide dust concentration in the environment containing dusts.

In one embodiment regarding the method of measuring dust concentration in an environment containing dusts, wherein the algorithm is:

$$\varepsilon = \frac{\ln\left(\frac{G_{0r1} - G_{gr1}}{G_{0r2} - G_{gr2}}\right)}{R}.$$

wherein $G_{0r1}$ and $G_{gr1}$ are intensity values calculated from the image/video of the darker sections and lighter sections of said first target, respectively; $G_{0r2}$ and $G_{gr2}$ are intensity values calculated from the image/video of the darker sections and lighter sections of said second target, respectively; R is the distance between said first target and said second target; and $\varepsilon$ is extinction coefficient of the environment containing dusts.

In one embodiment regarding the method of measuring dust concentration in an environment containing dusts, wherein said one or more darker sections and one or more lighter sections of said first target and said second target can be of any shape.

In one embodiment regarding the method of measuring dust concentration in an environment containing dusts, wherein the image and/or video capturing device comprising applications that can analyze and provide dust concentration in the environment containing dusts with the algorithm:

$$\varepsilon = \frac{\ln\left(\frac{G_{0r1} - G_{gr1}}{G_{0r2} - G_{gr2}}\right)}{R}.$$

In one embodiment regarding the method of measuring dust concentration in an environment containing dusts, wherein the image and/or video capturing device is an android-based or iPhone OS (iOS) based smartphone.

In one embodiment, the present disclosure provides an apparatus system for measuring dust concentration in an environment containing dusts, wherein the system comprises:

an image and/or video capturing device;

a first target, wherein the first target has a surface comprising one or more darker sections and one or more lighter sections, wherein said one or more darker sections and one or more lighter sections can provide sufficient contrast, and said one or more lighter sections are configured to provide reference background; and a second target, wherein the second target has a surface comprising one or more darker sections and one or more lighter sections, wherein said one or more darker sections and one or more lighter sections can provide sufficient contrast, and said one or more lighter sections are configured to provide reference background;

wherein said image and/or video capturing device and said first target and said second target are positioned in such a way that said image and/or video capturing device can take image and/or video of the two targets.

In one embodiment regarding the apparatus system, wherein said image and/or video capturing device comprises applications that can analyze and provide dust concentration in the environment containing dusts with the algorithm:

$$\varepsilon = \frac{\ln\left(\frac{G_{0r1} - G_{gr1}}{G_{0r2} - G_{gr2}}\right)}{R}.$$

In one embodiment regarding the apparatus system, wherein the image and/or video capturing device is an android-based or iPhone OS (iOS) based smartphone.

Those skilled in the art will recognize that numerous modifications can be made to the specific implementations described above. The implementations should not be limited to the particular limitations described. Other implementations may be possible.

We claim:

1. A method of measuring dust concentration in an environment containing dusts, wherein the method comprises:
    providing an image and/or video capturing device;
    providing a first target, wherein the first target has a surface comprising one or more contrasting sections, and said one or more contrasting sections are configured to provide reference background;
    providing a second target, wherein the second target has a surface comprising one or more contrasting sections, and said one or more contrasting sections are configured to provide reference background; and
    positioning said image and/or video capturing device and said first target and said second target to ensure that said image and/or video capturing device can take image and/or video of the two targets;
    taking one or more image and/or video of said first target and said second target;
    analyzing captured one or more image and/or video with one or more algorithm to provide dust concentration in the environment containing dusts.

2. The method of claim 1, wherein the algorithm is:

$$\varepsilon = \frac{\ln\left(\frac{G_{0r1} - G_{gr1}}{G_{0r2} - G_{gr2}}\right)}{R}.$$

wherein $G_{0r1}$ and $G_{gr1}$ are intensity values calculated from the image/video of the contrasting sections of said first target, respectively; $G_{0r2}$ and $G_{gr2}$ are intensity values calculated from the image/video of the contrasting sections of said second target, respectively; R is the distance between said first target and said second target; and ε is extinction coefficient of the environment containing dusts.

3. The method of claim 1, wherein the one or more contrasting sections of said first target and said second target can be of any shape.

4. The method of claim 1, wherein the image and/or video capturing device comprising applications that can analyze and provide dust concentration in the environment containing dusts with the algorithm:

$$\varepsilon = \frac{\ln\left(\frac{G_{0r1} - G_{gr1}}{G_{0r2} - G_{gr2}}\right)}{R}.$$

5. The method of claim 1, wherein the image and/or video capturing device is an android-based or iPhone OS (iOS) based smartphone.

6. A system for measuring dust concentration in an environment containing dusts, wherein the system comprises:

an image and/or video capturing device;
a first target, wherein the first target has a surface comprising one or more contrasting sections, and said one or more contrasting sections are configured to provide reference background; and
a second target, wherein the second target has a surface comprising one or more contrasting sections, and said one or more contrasting sections are configured to provide reference background;
wherein said image and/or video capturing device and said first target and said second target are positioned in such a way that said image and/or video capturing device can take image and/or video of the two targets;
wherein said image and/or video of the two targets can be analyzed with one or more algorithm to provide dust concentration in the environment containing dusts.

7. The system of claim 6, wherein said image and/or video capturing device comprises applications that can analyze and provide dust concentration in the environment containing dusts with the algorithm:

$$\varepsilon = \frac{\ln\left(\frac{G_{0r1} - G_{gr1}}{G_{0r2} - G_{gr2}}\right)}{R}.$$

8. The system of claim 6, wherein the image and/or video capturing device is an android-based or iPhone OS (iOS) based smartphone.

9. The system of claim 6, wherein the surface of the first target comprising one or more contrasting sections includes a black section and a white section.

10. The system of claim 6, wherein the surface of the second target comprising one or more contrasting sections includes a black section and a white section.

11. The system of claim 6, wherein the one or more contrasting sections are shaped as stripes.

* * * * *